(12) United States Patent
Imaizumi et al.

(10) Patent No.: US 7,260,459 B2
(45) Date of Patent: Aug. 21, 2007

(54) TURNING MOTION CONTROL SYSTEM FOR VEHICLE

(75) Inventors: Nobuyuki Imaizumi, Wako (JP); Yoshihiro Iwagama, Wako (JP); Susumu Ohta, Wako (JP); Kazunari Okada, Wako (JP); Hironobu Kiryu, Wako (JP); Kazuya Sakurai, Wako (JP); Masakazu Shiraishi, Wako (JP); Tomoaki Sugano, Wako (JP); Toshio Yahagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 10/991,652

(22) Filed: Nov. 8, 2004

(65) Prior Publication Data
US 2005/0159867 A1    Jul. 21, 2005

(30) Foreign Application Priority Data
Nov. 27, 2003    (JP)    ............................. 2003-397825

(51) Int. Cl.
*G05D 1/00* (2006.01)
(52) U.S. Cl. ...................................................... 701/41
(58) Field of Classification Search .................. 701/41
See application file for complete search history.

(56) References Cited

U.S. PATENT DOCUMENTS 4,219,093 A * 8/1980 Lang ........................... 180/401
5,636,121 A * 6/1997 Tsuyama et al. .............. 701/70
6,183,052 B1 * 2/2001 Harada et al. ............... 303/147
2003/0195667 A1* 10/2003 Tange et al. ................... 701/1

FOREIGN PATENT DOCUMENTS

| JP | 11-029027 | 2/1999 |
| JP | 2000-346869 | 12/2000 |
| JP | 3214824 | 7/2001 |
| JP | 2002-037048 | 2/2002 |
| JP | 2003-146117 | 5/2003 |
| JP | 2003-226235 | 8/2003 |

* cited by examiner

*Primary Examiner*—Thu V. Nguyen
(74) *Attorney, Agent, or Firm*—Hamre, Schumann, Mueller & Larson, P.C.

(57) ABSTRACT

A turning motion control system for a vehicle includes an actuator, and an actuator control device for controlling the actuator so that an actual turning motion state of the vehicle becomes close to a target turning motion state. The actuator control device is designed so that its control-permitted state and its control-stopped state can be switched from one to another through a switching device operated by a driver. When an air-pressure decreased state detecting device has detected an air-pressure decreased state, the actuator control device carries out the control of the operation of the actuator, irrespective of a switching mode of the switching device. Thus, even if an air-pressure decrease or an abnormality is generated in any of wheels in a state in which the turning motion control by the actuator has been stopped, the stability of the vehicle can be ensured.

1 Claim, 6 Drawing Sheets

TURNING MOTION CONTROL SYSTEM FOR VEHICLE

RELATED APPLICATION DATA

The Japanese priority application No. 2003-397825 upon which the present application is based is hereby incorporated in its entirety herein by reference.

BACKGROUND OF THE INVENTION

1. Field of the Invention

The present invention relates to a turning motion control system for a vehicle, comprising: a target turning motion state determining means for determining a target turning motion state of the vehicle; a turning motion state detecting means for detecting an actual turning motion of the vehicle; an actuator control means for controlling an actuator so that the actual turning motion state of the vehicle detected by the turning motion state detecting means becomes close to the target turning motion state determined by the target turning motion state determining means; and a switching means adapted to switch over a control-permitted state and a control-stopped state of the actuator upon operation by a driver.

2. Description of the Related Art

Such a turning motion control system is already known, for example, from Japanese Patent Publication No. 3214824. There is another conventional turning motion control system, in which turning motion control by operation of an actuator is turned on and off by a vehicle driver's intention during circuit traveling or for a convenience of use.

However, in a state in which the turning motion control by the actuator has been stopped by the driver's intention, if an air-pressure decreases in any of wheels or if any of the wheels is fallen into an abnormal state, stability of the vehicle is sometimes difficult to be secured when a sudden steering is conducted.

SUMMARY OF THE INVENTION

Accordingly, it is an object of the present invention to provide a turning motion control system for a vehicle, wherein stability of the vehicle can be ensured even if an air-pressure decrease or an abnormally is generated in any of wheels in a state in which turning motion control by an actuator has been stopped.

To achieve the above object, according to a first feature of the present invention, there is provided a turning motion control system for a vehicle, comprising: a target turning motion state determining means for determining a target turning motion state of the vehicle; a turning motion state detecting means for detecting an actual turning motion of the vehicle; an actuator control means for controlling an actuator so that the actual turning motion state of the vehicle detected by the turning motion state detecting means becomes close to the target turning motion state determined by the target turning motion state determining means; and a switching means adapted to switch over a control-permitted state and a control-stopped state of the actuator upon operation by a driver, wherein the system further comprises an air-pressure decreased state detecting means capable of detecting an air-pressure decreased state of any of wheels, and wherein the actuator control means is adapted to carry out the control of the operation of the actuator, irrespective of the switching mode of the switching means, when the air-pressure decreased state detecting means has detected the air-pressure decreased state.

With the arrangement of the first feature, in a state in which the driver has operated the switching means to stop the turning motion control by the actuator, when the air-pressure decreased state detecting means detects an air-pressure decreased state, the actuator control means controls the actuator so that the actual turning motion state of the vehicle becomes close to the target turning motion state. Therefore, the stability of the vehicle can be ensured.

According to a second feature of the present invention, there is provided a turning motion control system for a vehicle, comprising: a target turning motion state determining means for determining a target turning motion state of the vehicle; a turning motion state detecting means for detecting an actual turning motion of the vehicle; an actuator control means for controlling an actuator so that the actual turning motion state of the vehicle detected by the turning motion state detecting means becomes close to the target turning motion state determined by the target turning motion state determining means; and a switching means adapted to switch over a control-permitted state and a control-stopped state of the actuator upon operation by a driver, wherein the system further comprises: wheel speed sensors for detecting wheel speeds of a plurality of wheels, respectively; and a wheel abnormal state detecting means for detecting an abnormal state of any of the wheels, based on comparison of values detected by the wheel speed sensors with one another, and wherein the actuator control means is adapted to carry out the control of the operation of the actuator, irrespective of the switching mode of the switching means, when the air-pressure decreased state detecting means has detected the air-pressure decreased state.

With the arrangement of the second feature, in a state in which the driver has operated the switching means to stop the turning motion control by the actuator, when the wheel abnormal state detecting means detects an abnormal state of any of the wheels through comparison of the plurality of wheel speeds with one another, the actuator control means controls the actuator so that the actual turning motion state of the vehicle becomes close to the target turning motion state. Therefore, the stability of the vehicle can be ensured.

The above and other objects, features and advantages of the invention will become apparent from the following description of the preferred embodiment with reference to the accompanying drawings.

DESCRIPTION OF THE PREFERRED EMBODIMENT

Figure 1:
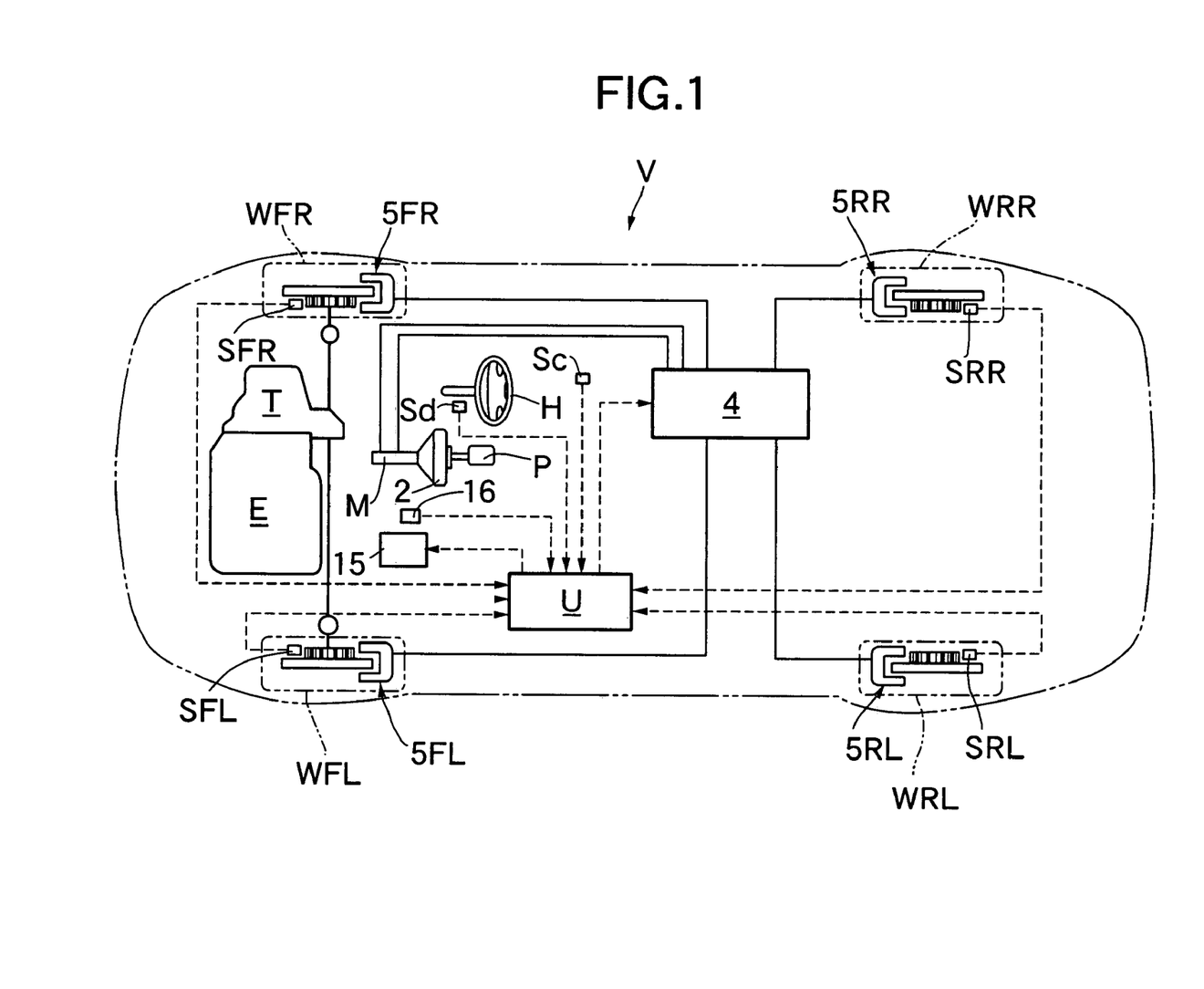
FIG. 1 is an illustration showing the entire arrangement of a drive system and a control system of a vehicle.

Referring first to FIG. 1, an output from a transmission T connected in series to an engine E is transmitted to front left and front right wheels WFL and WFR which are left end right driven wheels of a front-engine front-wheel-drive (FF)

vehicle V. Front left and front right wheel brakes 5FL and 5FR are mounted on the front wheels WFL and WFR. Rear left and rear right wheel brakes 5RL and 5RR are mounted on rear left and rear right wheels WRL and WRR which are left and right follower wheels.

A master cylinder M is of a tandem type and adapted to output a braking liquid pressure in response to the operation of a brake pedal P by a vehicle driver. The master cylinder M is connected to the wheel brakes 5FL, 5FR, 5RL and 5RR through an actuator 4 which is a braking liquid pressure control unit.

Figure 2:
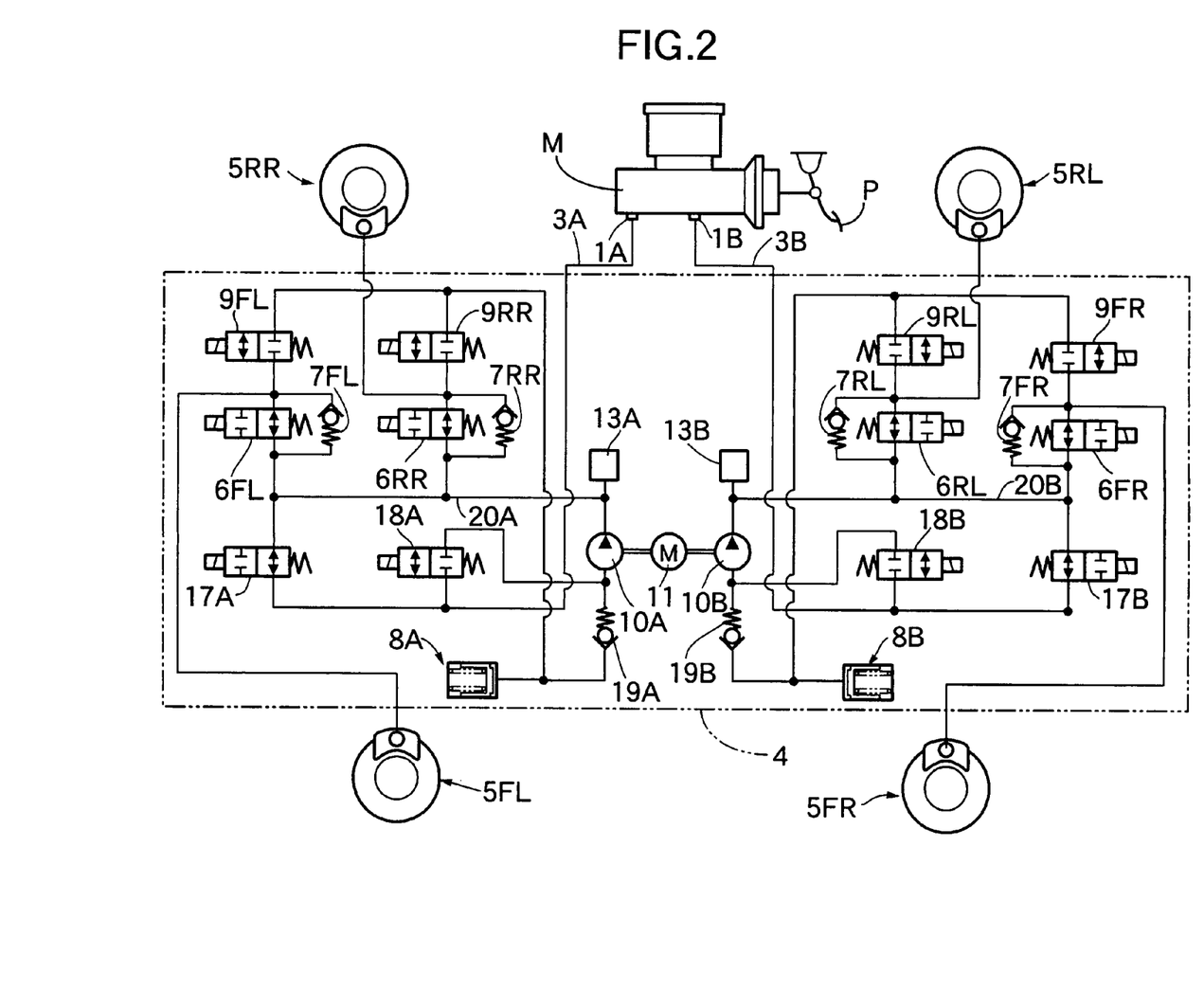
FIG. 2 is a diagram of a liquid pressure circuit showing arrangement of an actuator.

Referring to FIG. 2, the master cylinder M includes first and second output ports 1A and 1B which generate braking liquid pressures. The first output port 1A is connected to a first output liquid pressure passage 3A, and the second output port 1B is connected to a second output liquid pressure passage 3B. Both the output liquid pressure passages 3A and 3B are connected to the actuator 4.

The actuator 4 includes: a normally-opened type solenoid valve 6FL, a check valve 7FL and a normally-closed type solenoid valve 9FL, all of which correspond to the front left wheel brake 5FL; a normally-opened type solenoid valve 6RR, a check valve 7RR and a normally-closed type solenoid valve 9RR all of which correspond to the rear right wheel brake 5RR; a first reservoir 8A, a first pump 10A, a first damper 13A, a first cut valve 17A, a first suction valve 18A and a first one-way valve 19A, all of which correspond to the front left wheel brake 5FL and the rear right wheel brake 5RR; a normally-opened type solenoid valve 6FR, a check valve 7FR and a normally-closed type solenoid valve 9FR, all of which correspond to the front right wheel brake 5FR; a normally-opened type solenoid valve 6RL, a check valve 7RL and a normally-closed type solenoid valve 9RL, all of which correspond to the rear left wheel brake 5RL; a second reservoir 8B, a second pump 10B, a second damper 13B, a second cut valve 17B, a second suction valve 18B and a second one-way valve 19B, all of which correspond to the front right wheel brake 5FR and the rear left wheel brake 5RL.

The first output liquid pressure passage 3A is connected to a first liquid pressure passage 20A through the first cut valve 17A which is a normally-opened type solenoid valve. The second output liquid pressure passage 3B is connected to a second liquid pressure passage 20B through the second cut valve 17B which is a normally-opened type solenoid valve.

The first liquid pressure passage 20A is connected to the front left wheel brake 5FL through the normally-opened type solenoid valve 6FL, and to the rear right wheel brake 5RR through the normally-opened type solenoid valve 6RR. The second liquid pressure passage 20B is connected to the front right wheel brake 5FR through the normally-opened type solenoid valve 6FR, and to the rear left wheel brake 5RL through the normally-opened type solenoid valve 6RL. The check valves 7FL, 7FR, 7RL and 7RR are connected in parallel to the normally-opened type solenoid valves 6FL, 6FR, 6RL and 6RR, respectively.

The normally-closed type solenoid valves 9FL and 9RR are mounted between the first reservoir 8A and the front left wheel brake 5FL as well as the rear right wheel brake 5RR, respectively. The normally-closed type solenoid valves 9FR and 9RL are mounted between the second reservoir 8B and the front right wheel brake 5FR as well as the rear left wheel brake 5RL, respectively.

The first and second reservoirs 8A and 8B are connected to intake sides of the first and second pumps 10A and 10B driven by an electric motor 11 which is a common electric actuator through the first and second one-way valves 19A and 19B adapted to permit the flow of a braking liquid toward the pumps 10A and 10B. The first and second liquid pressure passages 20A and 20B are connected between the first and second pumps 10A and 10B and the one-way valves 19A and 19B through the first and second suction valves 18A and 18B which are normally-closed type solenoid valves, and to discharge sides of the first and second pumps 10A and 10B through the first and second dampers 13A and 13B.

In such an actuator 4, during usual braking in a state in which the first and second cut valves 17A and 17B have been opened and the first and second suction valves 18A and 18B haven been closed, the normally-opened type solenoid valves 6FL to 6RR are brought into a deexcited and opened state, and the normally-closed type solenoid valves 9FL to 9RR are brought into a deexcited and closed state; and a braking liquid pressure output from the first output port 1A in the master cylinder M is applied to the front left and rear right wheel brakes 5FL and 5RR through the normally-opened type solenoid valves 6FL and 6RR. In addition, a braking liquid pressure output from the second output port 1B in the master cylinder M is applied to the front right and rear left wheel brakes 5FR and 5RL through the normally-opened type solenoid valves 6FR and 6RL.

When a wheel is about to be brought into a locked state during the braking, one of the normally-opened type solenoid valves 6FL to 6RR corresponding to such a near-lock wheel is excited and closed, and one of the normally-closed type solenoid valves 9FL to 9RR corresponding the near-lock wheel is excited and opened. Thus, a portion of the braking liquid pressure for the near-lock wheel is absorbed into the first reservoir 8A or the second reservoir 8B, whereby the braking liquid pressure for the near-lock wheel is reduced.

To maintain the braking liquid pressure constant, the normally-opened type solenoid valves 6FL to 6RR are brought into an excited and closed state, and the normally-closed type solenoid valves 9FL to 9RR are brought into a deexcited and closed state. Further, to increase the braking liquid pressure, the normally-opened type solenoid valves 6FL to 6RR are brought into a deexcited and opened state, and the normally-closed type solenoid valves 9FL to 9RR are brought into a deexcited and closed state.

By controlling the deexcitation and excitation of the normally-opened type solenoid valves 6FL to 6RR and the normally-closed type solenoid valves 9FL and 9RR in this manner, the braking can be conducted with a good efficiency without locking the wheels.

During an antilock brake control operation as described above, the electric motor 11 is operated to rotate, and the first and second pumps 10A and 10B are driven with the operation of the electric motor 11. Therefore, the braking liquid absorbed into the first and second reservoirs 8A and 8B is drawn into the first and second pumps 10A and 10B, and then returned through the first and second dampers 13A and 13B into the first and second output liquid passages 3A and 3B. Such circulation of the braking liquid can prevent an increase in the amount of depression of the brake pedal P due to the absorption of the braking liquid into the first and second reservoirs 8A and 8B. Moreover, the pulsation of the pressure discharged from the first and second pumps 10A and 10B is suppressed by the action of the first and second dampers 13A and 13B, and the operational feeling of the brake pedal P cannot be degraded.

By operating the electric motor 11 in a state in which the first and second suction valves 18A and 18B have been excited and opened, and the first and second cut valves 17A and 17B have been excited and closed during non-braking operation, the first and second pumps 10A and 10B draw the braking liquid into themselves from the master cylinder M and discharge the pressurized braking liquid into the first and second liquid pressure passages 20A and 20B. By controlling the deexcitation and excitation of the normally-opened type solenoid valves 6FL to 6RR and the normally-closed type solenoid valves 9FL and 9RR in this state, the turning motion control of the vehicle can be carried out.

More specifically, when the vehicle is in an over-steered sate, the over-steered state can be overcome by operating the wheel brakes for the turning outer wheels; and when the vehicle is in an under-steered state, the under-steered state can be overcome by operating the wheel brakes for the turning inner wheels.

Referring again to FIG. 1, the operation of the actuator 4 is controlled by a control unit U, to which the following detection values are input: a detection value provided by a steering angle sensor Sd as a target turning motion state determining means for determining a target turning motion state for the vehicle based on an amount of operation of a steering wheel H; a detection value provided by a yaw rate sensor S as a turning motion state detecting means for detecting an actual turning motion state of the vehicle; and detection values provided by wheel speed sensors SFL, SFR, SRL and SRR for detecting wheel speeds of the wheels WFL, WFR, WRL and RR, respectively.

Figure 3:
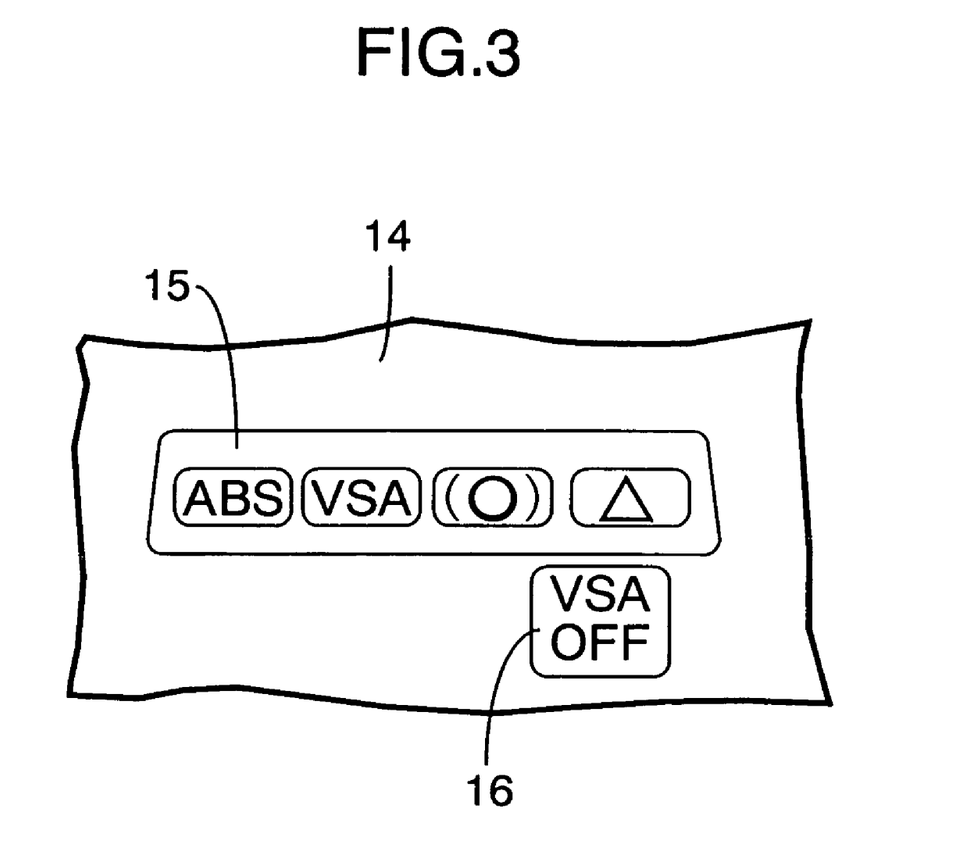
FIG. 3 is a diagram showing a portion of an instrument panel.

Referring to FIG. 3, an instrument panel 14a is provided with a meter 15 for indicating the operated state of the actuator 4, a warning and the like, and a selector switch 16 as a switching means for switching on and off of the turning motion control by the driver's intention. The indication of the meter 15 is controlled by the control unit U, and a switching signal provided by the selector switch 16 is input to the control unit U.

Figure 4:
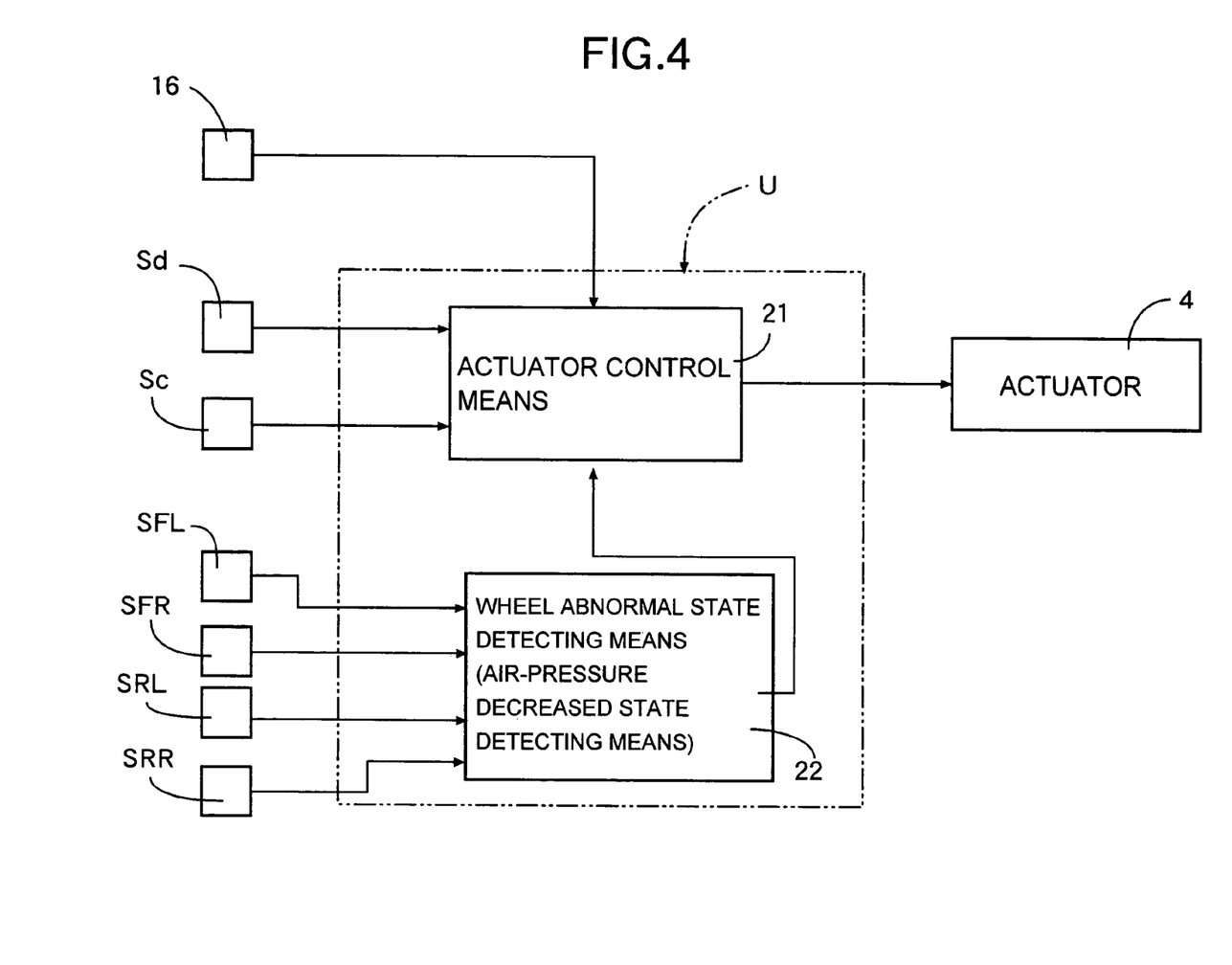
FIG. 4 is a diagram showing arrangement of the control system associated with turning motion control.

Referring to FIG. 4, a section of the control unit U, which is associated with the turning motion control, includes: an actuator control means 21 for controlling the operation of the actuator 4 to carry out the turning motion control of the vehicle; and a wheel abnormal state detecting means 22 adapted to detect an abnormal state of any of wheels and deliver the detection result to the actuator control means 21.

The wheel abnormal state detecting means 22 is adapted to detect the wheel abnormality by comparing the wheel speeds detected by the wheel speed sensors SFL, SFR, SRL and SRR with one another. The wheel abnormality is detected by a procedure shown in FIG. 5.

Figure 5:
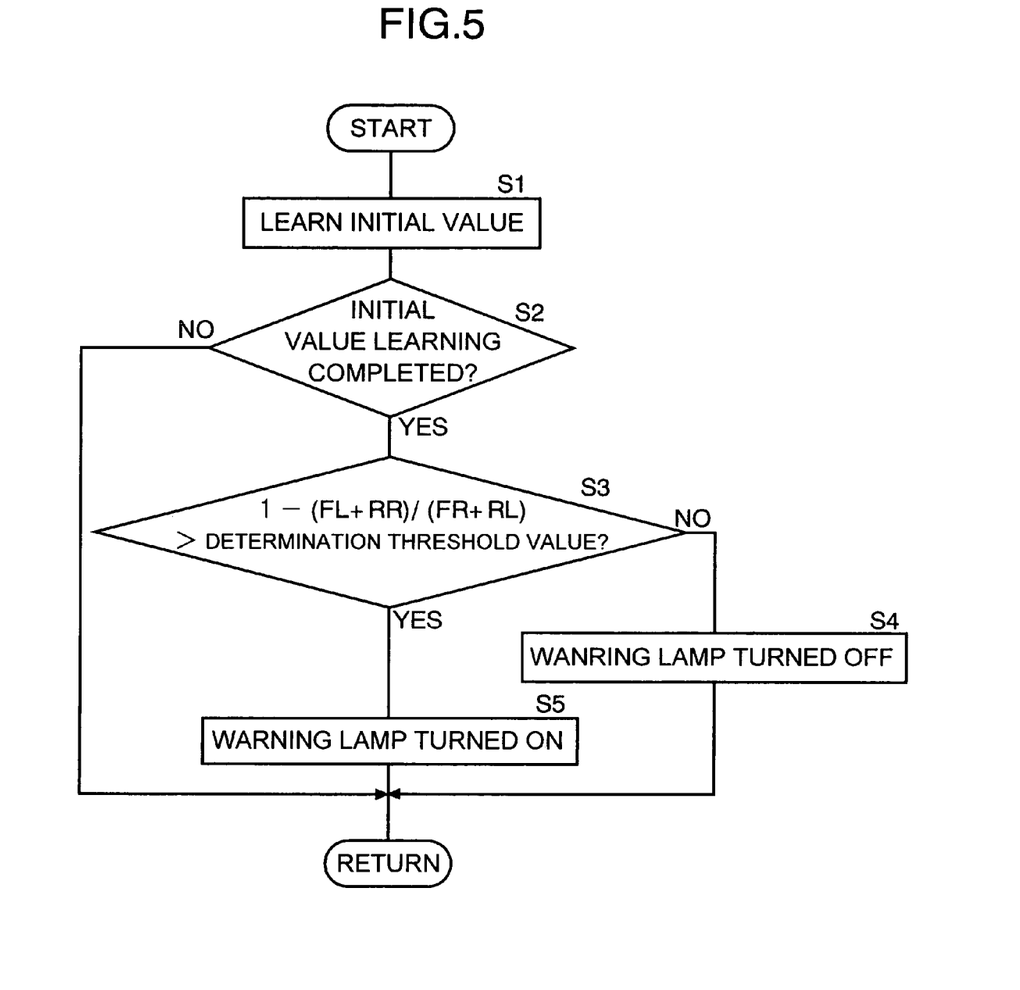
FIG. 5 is a flow chart showing a procedure of detecting an abnormal state by a wheel abnormal state detecting means.

After learning of an initial valve at Step S1, it is confirmed at Step S2 whether or not the learning of the initial valve has been completed. After the completion of the learning of the initial value, it is determined at Step S3 whether or not a relation $(1-VR) > a$ determination threshold value is established, wherein an equation $\{(FL+RR)/(FR+RL)\}=VR$ is established, when FL and FR representing wheel speeds of the front left and front right wheels, and RL and RR representing wheel speeds of the rear left and rear right wheels. When $(1-VR) \leq$ the determination threshold value is established, it is determined that the wheels are not in an abnormal state, to proceed to Step S4 at which a warning lamp is still turned off. On the other hand, when $(1-VR) >$ the determination threshold value is established, it is determined that any of the wheels is in an abnormal state, to proceed to Step S5 at which the warning lamp is turned on, and a signal indicating that any of the wheels is in the abnormal state is input to the actuator control means 21.

The abnormal state of the wheel means a state in which an air pressure in the wheel has been decreased, or a tire has been punctured, or a tire with a different diameter has been mounted on the wheel by mistake. Thus, the wheel abnormal state detecting means 22 also functions as an air-pressure decreased state detecting means for detecting a decrease in air pressure of the wheel.

The actuator control means 21 controls the actuator 4 so that the steering angle of the steering wheel H detected by the steering angle sensor Sd becomes a value in the target turning motion state, and so that the actual turning motion state detected by the yaw rate sensor Sc becomes close to the target turning motion state. When the driver selects to operate the selector switch 16 to stop the turning motion control, the control of the actuator 4 by the actuator control means 21 for control of the turning motion is stopped, unless the wheel abnormal state detecting means 22 has detected the wheel abnormality.

Figure 6:
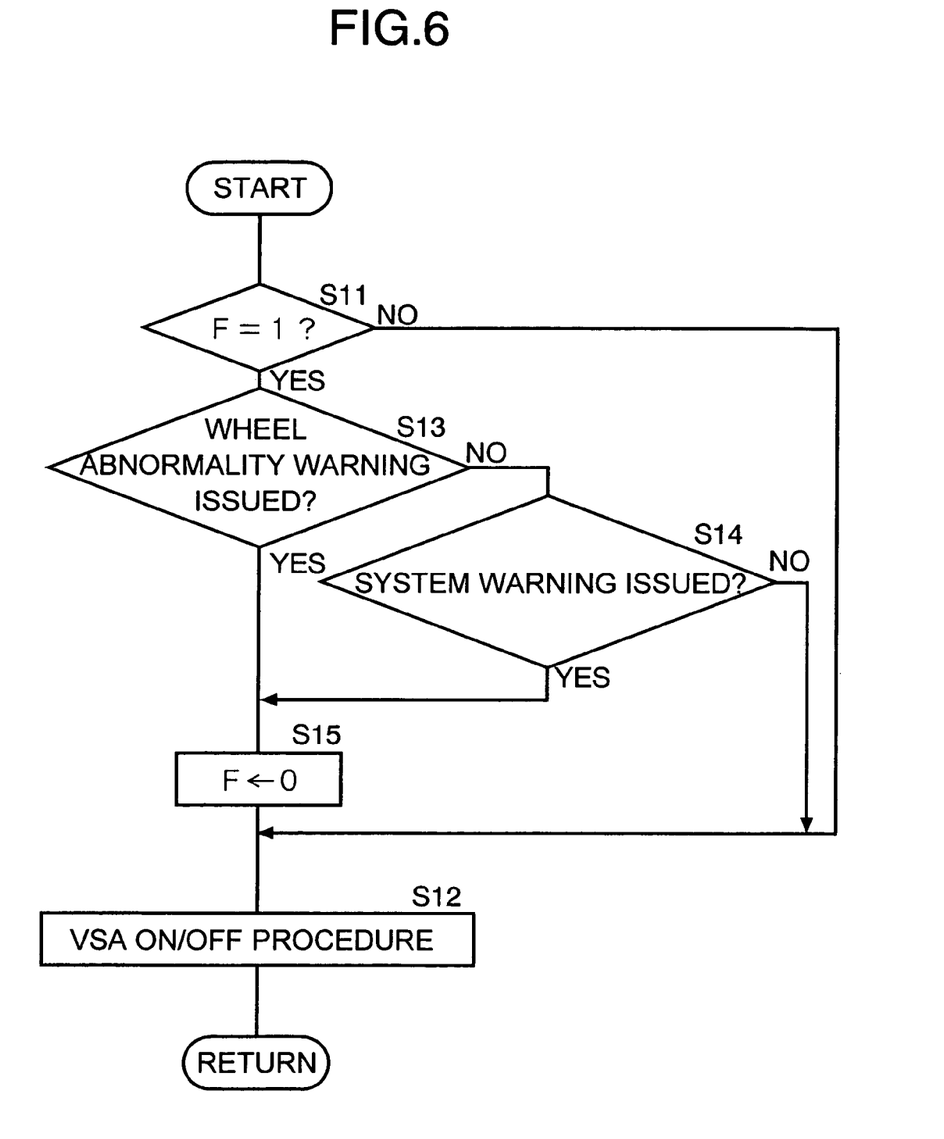
FIG. 6 is a flow chart showing a procedure of determining whether or not turning motion control should be conducted.

Namely, in the actuator control means 21, the turning motion control is carried out by a procedure shown in FIG. 6. At Step S11, it is determined whether or not a flag F is at 1. The flag F is based on a signal from the selector switch 16. When the driver selects to stop the turning motion control, the flag F assumes "1".

When it is confirmed at Step S1 that the flag F is "0", the procedure is advanced to Step 13 at which vehicle stability assist (VSA) is carried out. When it is confirmed at Step S11 that the flag F is "1", the procedure is advanced to Step S13 at which it is confirmed whether or not the wheel abnormal state detecting means 22 has detected a wheel abnormality. When the wheel abnormal state detecting means 22 has not detected a wheel abnormality, the procedure is advanced to Step S14 at which it is confirmed whether or not an abnormality has been generated in the wheel abnormal state detecting procedure and a warning has been issued. When it is confirmed that the wheel abnormal state detecting procedure has been normally performed, the procedure is advanced to Step S12.

When it is confirmed at Step S13 that the wheel abnormal state detecting means 22 has detected a wheel abnormality, as well as when it is confirmed at Step S14 that the wheel abnormal state detecting means 22 has not detected a wheel abnormality but an abnormality has been generated in the wheel abnormal state detecting procedure and the warning has been issued, the procedure is advanced to Step S15 at which the flag F is set at "0", to advance to Step S12. In other words, when it is confirmed that the wheel abnormal state detecting means 22 has detected the wheel abnormality, as well as when it is confirmed that the wheel abnormal state detecting means 22 has not detected any wheel abnormality, but an abnormality has been found in the wheel abnormal state detecting procedure and the warning has been emitted, the flag F is forcibly set at "0", whereby the actuator control means 21 controls the operation of the actuator 4 to conduct the vehicle stability assist, irrespective of the switching mode of the selector switch 16.

The operation of the present embodiment will be described below. Values detected by the wheel speed sensors SFL, SFR, SRL and SRR for detecting the wheel speeds of the wheels WFL, WFR, WRL and WRR, respectively, are input to the wheel abnormal state detecting means 22, which detects an abnormal state of any of the wheels based on the comparison of the values detected by the wheel speed sensors SFL, SFR, SRL and SRR with one another. When the wheel abnormal state detecting means 22 has detected an abnormal state of any of the wheels, the actuator control means 21 adapted to control the turning motion of the vehicle by controlling the operation of the actuator 4 controls the operation of the actuator 4, irrespective of the switching mode of the selector switch 16 adapted to switch over a control-permitted state and a control-stopped state of the actuator 4 upon operation by the driver.

Therefore, even in a state in which the driver has operated the selector switch 16 to stop the turning motion control by the operation of the actuator 4, when the wheel abnormal state detecting means 22 has detected an abnormal state of any wheel based on comparison of the wheel speeds with one another, the actuator control means 21 controls the actuator 4 so that the actual turning motion state of the vehicle becomes close to the target turning motion sate. Therefore, even if an abnormality of a wheel has been generated in a state in which the turning motion control by the operation of the actuator 4 has been stopped, the stability of the vehicle can be ensured.

In the above-described embodiment, the abnormality of the wheel is detected by the comparison of the wheel speeds of the wheels WFL, WFR, WRL and WRR with one another, but sensors for detecting air pressures may be mounted separately on the wheels WFL, WFR, WRL and WRR so that decrease in the air pressures of the wheels is detected by wireless signal transmission from the sensors. When an air-pressure decreased state has been detected, the control of the operation of the actuator 4 may be carried out, irrespective of the switching mode of the selector switch 16. With this arrangement, even in a state in which the driver has operated the selector switch 16 to stop the turning motion control by the operation of the actuator 4, the actuator control means 21 controls the actuator 4 so that the actual turning motion state of the vehicle becomes close to the target turning motion state, in response to the air pressure decrease. Therefore, the stability of the vehicle can be ensured.

Although the embodiment of the present invention has been described in detail, it will be understood that the present invention is not limited to the above-described embodiment, and various modifications in design may be made without departing from the subject matter of the invention defined in the claims.

What is claimed is:

1. A turning motion control system for a vehicle, comprising:
    a target turning motion state determining means for determining a target turning motion state of the vehicle;
    a turning motion state detecting means for detecting an actual turning motion of the vehicle;
    an actuator control means for controlling an actuator so that the actual turning motion state of the vehicle detected by the turning motion state detecting means becomes close to the target turning motion state determined by the target turning motion state determining means; and
    a switching means adapted to switch over a control-permitted state and a control-stopped state of the actuator upon operation by a driver,
    wherein the system further comprises an air-pressure decreased state detecting means capable of detecting an air-pressure decreased state of any of wheels, and
    wherein the actuator control means is adapted to carry out the control of the operation of the actuator, irrespective of the switching mode of the switching means, when the air-pressure decreased state detecting means has detected the air-pressure decreased state.

* * * * *

UNITED STATES PATENT AND TRADEMARK OFFICE
CERTIFICATE OF CORRECTION

PATENT NO. : 7,260,459 B2  Page 1 of 1
APPLICATION NO. : 10/991652
DATED : August 21, 2007
INVENTOR(S) : Imaizumi et al.

It is certified that error appears in the above-identified patent and that said Letters Patent is hereby corrected as shown below:

Title Page;
First page, first column, line 2 of (75) Inventors: "Yoshihiro Iwagama" should read --Yoshihiro Iwagawa--.

Signed and Sealed this

Eighteenth Day of December, 2007

JON W. DUDAS
*Director of the United States Patent and Trademark Office*